Sept. 28, 1937.  F. A. FAUST  2,094,319
SANITARY PRESSURE OPERATED DEVICE
Filed Aug. 31, 1935

INVENTOR.
FRED A. FAUST
BY
ATTORNEY.

Patented Sept. 28, 1937

2,094,319

UNITED STATES PATENT OFFICE 2,094,319

SANITARY PRESSURE OPERATED DEVICE

Fred A. Faust, Waterbury, Conn., assignor to The Bristol Company, Waterbury, Conn., a corporation of Connecticut Application August 31, 1935, Serial No. 38,704

5 Claims. (Cl. 200—83)

This invention relates to control devices, and more particularly to an automatic switch or valve device adapted to be actuated by the variations in pressure of a fluid, being particularly suited for use with liquids of a nature readily subject to contamination.

In the design of equipment for the processing, for example, of milk or other contaminable liquids, it is essential that every precaution be taken toward maintaining sanitary conditions, which involves the avoidance of recesses, interstices or constricted inaccessible spaces where said liquid might lodge and decompose. It is also required that it be possible readily to dismantle all parts having surfaces in contact with the liquid, for the purpose of cleaning and sterilizing. In those processes where it is required that there be maintained a continuous flow of liquid, it becomes highly desirable that means be provided to indicate failure of such flow, either by the operating of an alarm or by the automatic manipulating of certain switches or valves controlling associated elements in the system.

It is an object of this invention to provide a fluid-pressure actuated switch or valve, which shall be adapted to actuation by the static pressure of such a liquid and which device when installed shall present no irregular or constricted spaces wherein such liquid or substances likely to contaminate the same may lodge.

It is a further object to provide such a device in a form that may readily be removed for cleaning of exposed surfaces.

In carrying out the invention, the novel control apparatus is adapted to be secured in sealed relationship to a fitting of a fluid piping system, and at its inner portion has secured a resilient element presenting a smooth surface and adapted to respond to changes in pressure of the fluid within said system. An electric switch or valve means is located at the outermost portion of apparatus beyond the fitting and is actuated by said resilient element.

The nature of the invention, however, will best be understood when described in connection with the accompanying drawing, in which.

Figure 1:
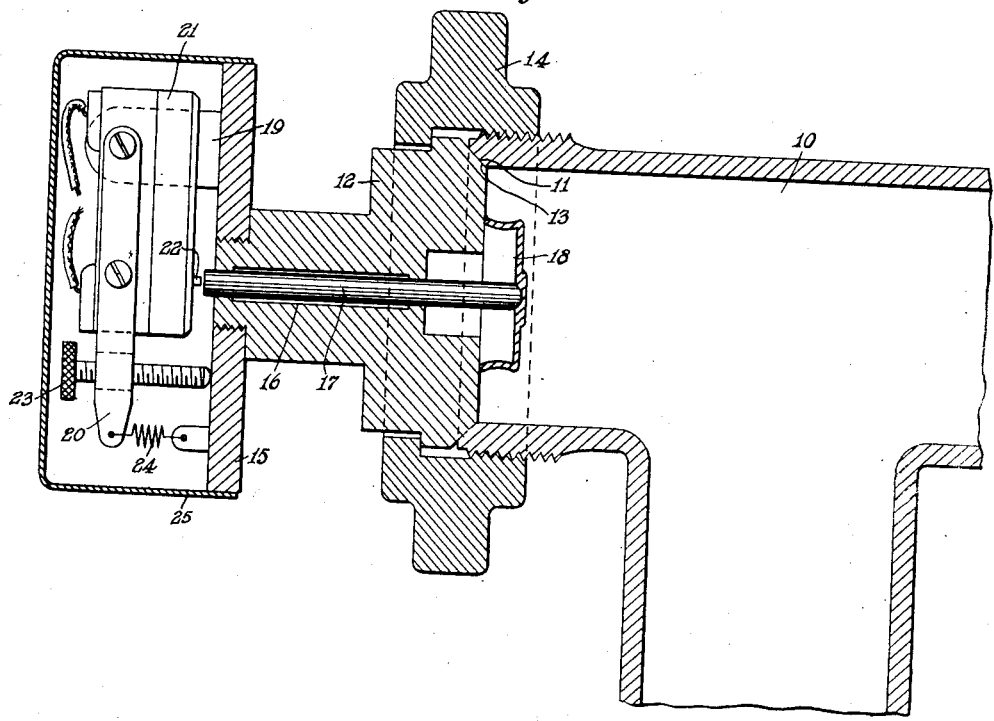
Fig. 1 is a longitudinal sectional view of a pressure-actuated switch apparatus embodying the features of the invention, and mounted in operative relationship on a fitting of a system of dairy piping, the thickness of the capsule member being shown greatly exaggerated.

Referring to the drawing, Fig. 1 shows a conventional T-pipe fitting 10 such as is usual in dairy installations, having an outer portion with a threaded periphery and an internal conical surface 11. A base block 12 of the novel valve device has a conical surface 13 adapted to make with surface 11 a liquid-tight joint; and it is held in engagement with the fitting 10 by a threaded clamping ring 14 cooperating with the threaded peripheral portion of the said fitting.

Threadedly mounted upon the base block 12 is a mounting plate 15; and through the axis of this block is provided an opening 16 permitting free passage of a rod 17. Secured upon the inner surface of the block 12, as by brazing, welding or soldering, is a domed or capsular metal member 18 having a resilient portion directly exposed to the fluid within the fitting 10, and adapted to deflect in response to variations in the pressure of said fluid. This deflection is utilized to move rod 17 in a longitudinal sense in that the inner end of the said rod contacts said resilient portion. The inner face of the block 12 and of the member 18 may be tinned or otherwise coated to provide a smooth and easily cleanable surface.

Carried upon the mounting plate 15 is a pedestal 19, and pivoted upon said pedestal in a sense to swing through a limited angle about an axis perpendicular to but not intersecting that of the base block is a bracket 20 having affixed thereto an electric switch 21, preferably of the type set forth in U. S. Letters Patent #1,960,020. This switch comprises an operating button 22 adapted to be engaged by the rod 17 and, by axial movement thereof, to be actuated in a sense to operate the contacts (not shown) of the switch. The switch 21 may be of the circuit-opening, circuit-closing or double-throw type, as suited to the needs of the installation.

A manually adjustable screw 23, threaded into the bracket 20 and engaging the mounting plate 15, into contact with which the said screw is held by a tension spring 24, provides an adjustment of the position of the switch 21 in relation to the rod 17, and thus of the range of pressures on the member 18 necessary to operate the switch. A cover member 25 provides protection for the switch and its adjustments against moisture or mechanical damage.

Figure 2:
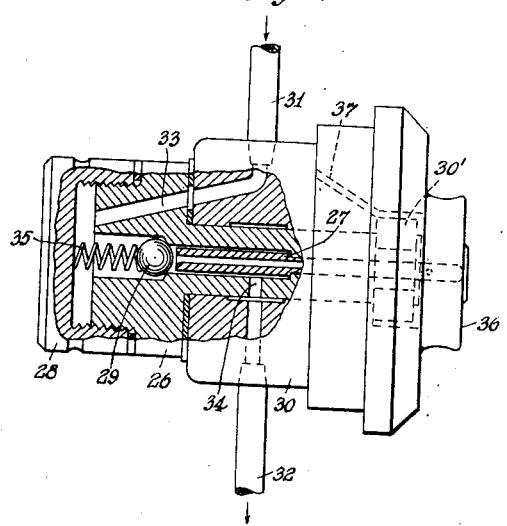
Fig. 2 is a view, partly in longitudinal section, of a valve suited for use as a pilot valve in a pneumatic control system, and arranged to be mounted in a suitable fitting of a system of dairy piping.

Fig. 2 shows a form of the invention in which a valve suited to the control of pneumatic devices is made responsive to movements of the resilient member. A valve, preferably of the type set forth in U. S. Letters Patent #1,890,494, having a body portion 26, a stem member 27, a cap 28 and a seating ball 29, is secured to a base block 30 in any expedient manner, as by means of a nut 30' about its inner end. Inlet and outlet connections 31 and 32, respectively, formed in the base block, will register with the corresponding inlet port 33 and outlet port 34 of the valve body. The flow of a control fluid will thus be regulated in accordance with the position of ball 29. The said seating ball 29 may, if necessary, be backed with a compression spring 35 to permit of the valve being installed in any desired position.

The block 30 is conformed similarly to the base block 12, of the embodiment shown in Fig. 1, for securing the same to a piping system; and upon its inner surface there is affixed a member 36 having a resilient portion, operatively engaging the valve stem 27. A vent 37 formed in the body of the base block serves to maintain the space within the member 36 at atmospheric pressure.

Under operating conditions, milk or other liquid being processed circulates through fitting 10 under a static pressure, generally derived from a motor-driven pump (not shown), and sufficient to depress or force inwardly the resilient portion of the capsular member and to actuate thereby the switch or valve, as the case may be, and thus set up an electric or pneumatic condition consistent with normal operation. In the event of stoppage of flow, due to failure of the pump, or for any other reason, the static pressure will be lessened to an extent that the switch or valve will be actuated in a sense to indicate an abnormal condition. Either an alarm may be operated thereby or the operation of associated apparatus effected or corrective measures in the operation may be initiated thereby.

Upon shutting down the plant, it is only necessary to unscrew the clamping ring, when the switch or valve assembly may be removed from fitting of the system, and the smooth interior surface previously presented to the processed liquid completely exposed for cleaning.

I claim:

1. A sanitary control means for association with a fitting for a fluid piping system having a closure seat forming a part thereof, said means comprising a closure element having a seat cooperating with the fitting seat and adapted to be held thereat in sealed relationship with the system, an elastic diaphragm member integral with the inner end of the closure element, bodily immovable and having a rear surface and a smooth front surface, said diaphragm being subject on said rear surface solely to atmospheric pressure, and on the front surface being exposed constantly only to the fluid pressure prevailing within the system, and the said element including the elastic member being adapted to respond to changes in pressure of fluid within the system and maintaining a smooth surface of permanent identity, and control means carried by the closure element at its outermost portion and including a member freely and slidably carried within the closure element for actuation by said elastic member, said closure element embodying said elastic member and control means being separable as a unit from the fitting, whereby control adjustment remains undisturbed upon removal and replacement of said closure element.

2. A sanitary control means for association with a fitting for a fluid piping system having a closure seat forming a part thereof, said means comprising a closure element having a seat cooperating with the fitting seat and adapted to be held thereat in sealed relationship with the system, an elastic capsular metallic diaphragm member integral with the inner end of the closure element, bodily immovable and having a rear surface and a smooth front surface, said diaphragm being subject on said rear surface solely to atmospheric pressure, and on the front surface being exposed constantly only to the fluid pressure prevailing within the system, and the said element including the elastic member being adapted to respond to changes in pressure of fluid within the system and maintaining a smooth surface of permanent identity, and control means carried by the closure element at its outermost portion and including a member freely and slidably carried within the closure element for actuation by said elastic member, said closure element embodying said elastic member and control means being separable as a unit from the fitting, whereby control adjustment remains undisturbed upon removal and replacement of said closure element.

3. A sanitary control means for association with a fitting for a fluid piping system having a closure seat forming a part thereof, said means comprising a closure element having a seat cooperating with the fitting seat and adapted to be held thereat in sealed relationship with the system, an elastic diaphragm member integral with the inner end of the closure element, bodily immovable and having a rear surface and a smooth front surface, said diaphragm being subject on said rear surface solely to atmospheric pressure, and on the front surface being exposed constantly only to the fluid pressure prevailing within the system, and the said element including the elastic member being adapted to respond to changes in pressure of fluid within the system and maintaining a smooth surface of permanent identity, and an electric switch carried by the closure element at its outermost portion and including a member freely and slidably carried within the closure element for actuation by said elastic member, said closure element embodying said elastic member and the electric switch being separable as a unit from the fitting, whereby control adjustment remains undisturbed upon removal and replacement of said closure element.

4. A sanitary control means for association with a fitting for a fluid piping system having a closure seat forming a part thereof, said means comprising a closure element having a seat cooperating with the fitting seat and adapted to be held thereat in sealed relationship with the system, an elastic diaphragm member integral with the inner end of the closure element, bodily immovable and having a rear surface and a smooth front surface, said diaphragm being subject on said rear surface solely to atmospheric pressure, and on the front surface being exposed constantly only to the fluid pressure prevailing within the system, and the said element including the elastic member being adapted to respond to changes in pressure of fluid within the system and maintaining a smooth surface of permanent identity, and control means carried by the closure element at its outermost portion and including an actuating member extending axially through the closure element between said elastic diaphragm member and the said control means for actuation by said elastic member, said closure element embodying said elastic member and control means being separable as a unit from the fitting, whereby control adjustment remains undisturbed upon removal and replacement of said closure element.

5. A sanitary control means for association with a fitting for a fluid piping system having a closure seat forming a part thereof, said means comprising a closure element having a seat cooperating with the fitting seat and adapted to be held thereat in sealed relationship with the system, there being provided through said element an axial passageway, an elastic diaphragm member integral with the inner end of the closure element, bodily immovable to seal off its passageway thereat and having a rear surface and a smooth front surface, said diaphragm being subject on said rear surface solely to atmospheric pressure, and on the front surface being exposed constantly only to the fluid pressure prevailing within the system, and the said element including the elastic member being adapted to respond to changes in pressure of fluid within the system and maintaining a smooth surface of permanent identity, and control means carried by the closure element at its outermost portion and including a member freely slidable through said passageway for actuation by said elastic member, said closure element embodying said elastic member and control means being separable as a unit from the fitting, whereby control adjustment remains undisturbed upon removal and replacement of said closure element.

FRED A. FAUST.